United States Patent
Kamada et al.

(10) Patent No.: US 8,810,155 B2
(45) Date of Patent: Aug. 19, 2014

(54) ILLUMINATION LIGHT COMMUNICATION DEVICE, AND ILLUMINATION APPARATUS AND SYSTEM INCLUDING SAME

(75) Inventors: Masao Kamada, Osaka (JP); Eiji Shiohama, Osaka (JP); Hiroyuki Nishino, Osaka (JP); Minoru Maehara, Osaka (JP); Yosiaki Hasitani, Osaka (JP); Yosuke Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 13/547,361

(22) Filed: Jul. 12, 2012

(65) Prior Publication Data
US 2013/0015785 A1    Jan. 17, 2013

(30) Foreign Application Priority Data

Jul. 15, 2011   (JP) ................................. 2011-157173

(51) Int. Cl.
H05B 37/02 (2006.01)
H05B 33/08 (2006.01)
H04B 10/116 (2013.01)

(52) U.S. Cl.
CPC ........ H05B 33/0845 (2013.01); H05B 33/0821 (2013.01); H04B 10/116 (2013.01)
USPC ............................ 315/297; 315/247; 315/307

(58) Field of Classification Search
USPC ......... 315/246, 247, 250, 291, 294, 297, 307, 315/308
See application file for complete search history.

(56) References Cited

U.S. PATENT DOCUMENTS

| | | | |
|---|---|---|---|
| 8,354,804 B2 * | 1/2013 | Otake et al. ................... | 315/308 |
| 8,513,902 B2 * | 8/2013 | Ohtake et al. ................. | 315/307 |
| 8,610,364 B2 * | 12/2013 | Melanson et al. ........ | 315/200 R |
| 8,618,738 B2 * | 12/2013 | Wen et al. ..................... | 315/192 |
| 2007/0182347 A1 * | 8/2007 | Shteynberg et al. .......... | 315/312 |

FOREIGN PATENT DOCUMENTS

JP          2011-34713          2/2011

\* cited by examiner

*Primary Examiner* — Tung X Le

(74) *Attorney, Agent, or Firm* — Renner, Otto, Boisselle & Sklar, LLP

(57) ABSTRACT

An illumination light communication device includes a power supply unit controlling a load current in a light source unit to be maintained constant based on a dimming signal; an impedance unit series connected to the light source unit; a switch element parallel connected to the impedance unit to connect/disconnect the impedance unit with the light source unit; and a control unit controlling on/off of the switch element to modulate a light intensity of the light source unit such that a binary communication signal is superimposed on illumination light therefrom. The control unit controls the impedance of the impedance unit such that a difference between magnitudes of the load currents respectively when the pulse of the communication signal is superimposed and is not superimposed is maintained constant regardless of a dimming rate of the dimming signal in a range of a dimming rate equal to or greater than a predetermined level.

10 Claims, 8 Drawing Sheets

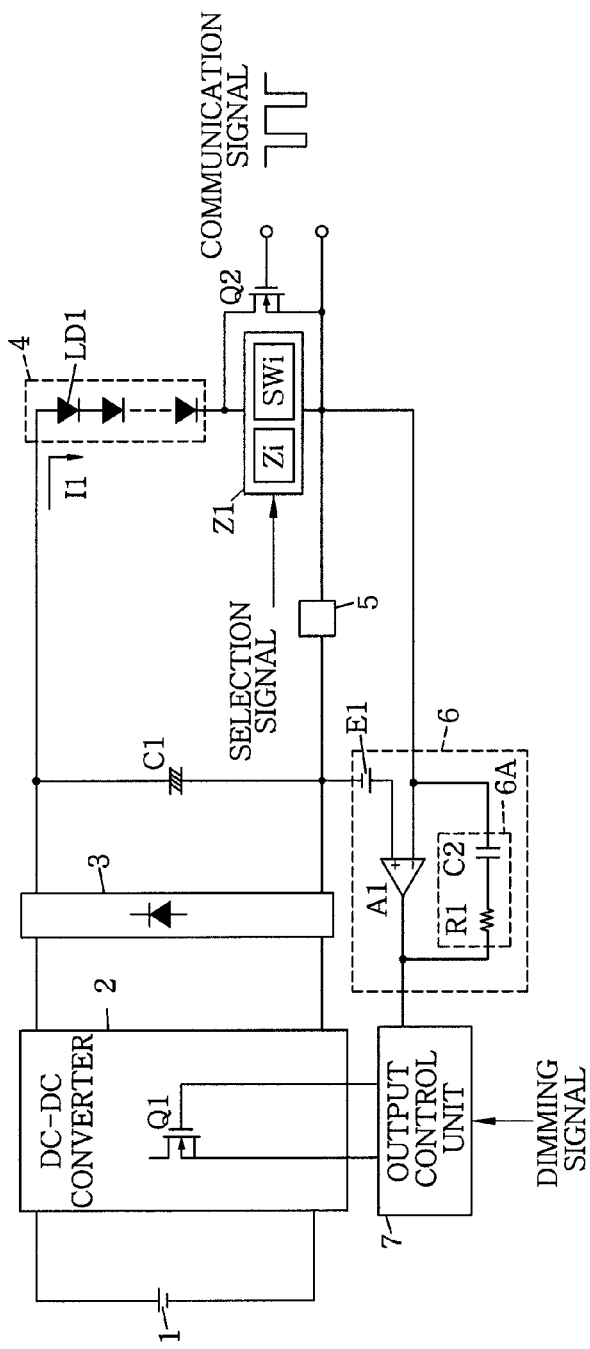
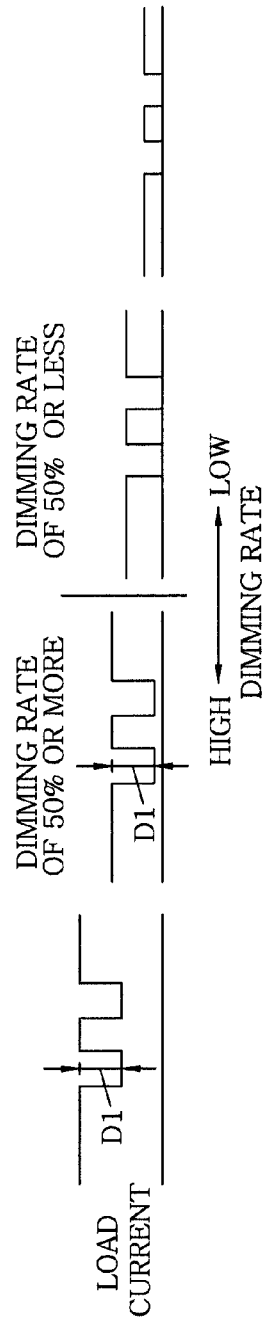

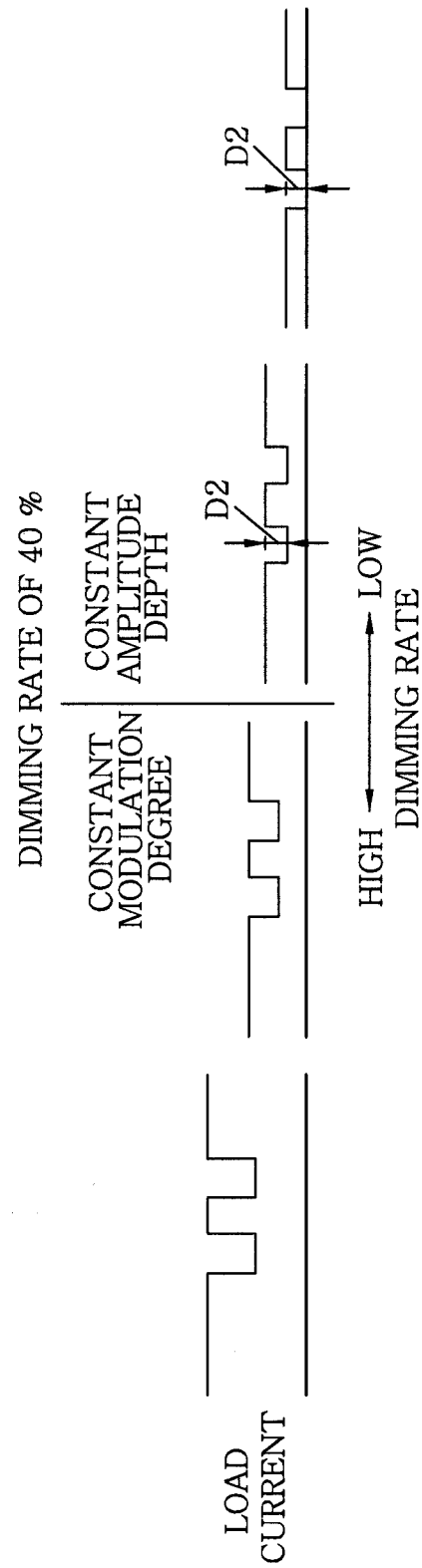

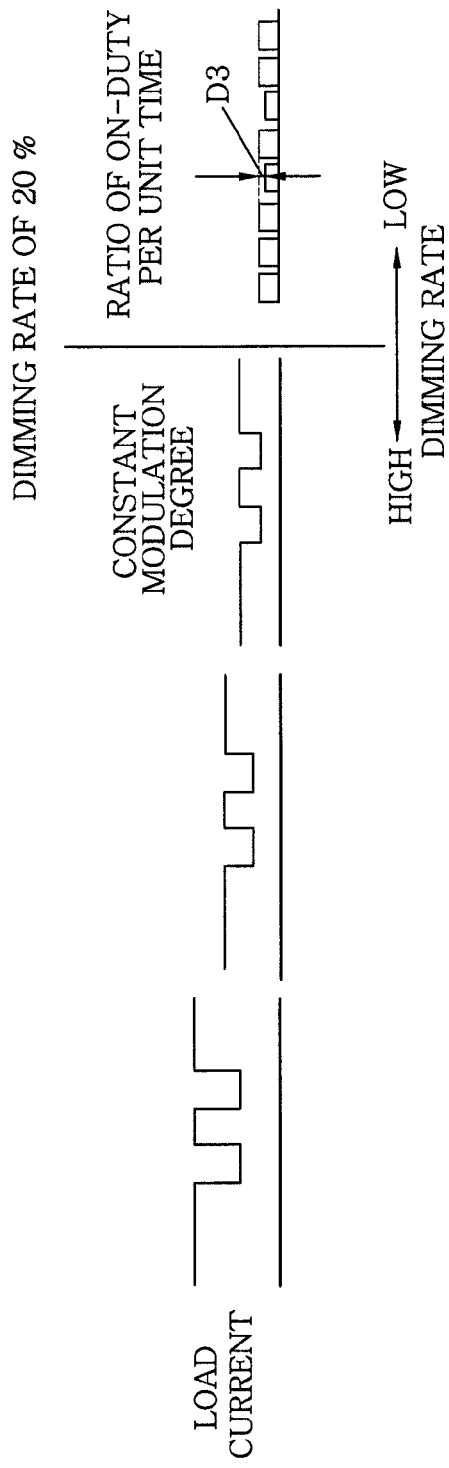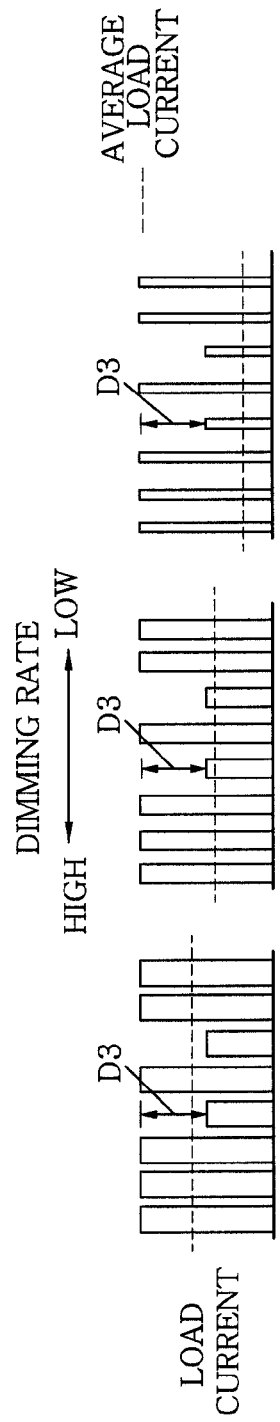
FIG.5B
FIG.5C

ILLUMINATION LIGHT COMMUNICATION DEVICE, AND ILLUMINATION APPARATUS AND SYSTEM INCLUDING SAME

FIELD OF THE INVENTION

The present invention relates to an illumination light communication device performing visible light communication by modulating an intensity of illumination light, and an illumination apparatus and illumination system including same.

BACKGROUND OF THE INVENTION

In recent years, there has been proposed an illumination apparatus with a visible light communication function to transmit a variety of information in a free space by using illumination light. Such illumination apparatus is disclosed in, e.g., Japanese Patent Application Publication No. 2011-34713. The illumination apparatus described in Japanese Patent Application Publication No. 2011-34713 includes a light emitting portion substrate on which light emitting diodes serving as semiconductor light emitting elements are disposed, a lighting circuit substrate which is connected to the light emitting portion substrate to control lighting of the light emitting diodes, and a visible light communication control substrate which performs a visible light communication control of the light emitting diodes. The visible light communication control substrate is detachably connected between the lighting circuit substrate and the light emitting portion substrate, and thus, in this conventional example, it is possible to generalize the design of the illumination apparatuses with/without the visible light communication function.

In the conventional example, the visible light communication is carried out by modulating an intensity of the illumination light based on an information signal (communication signal) to be transmitted. In other words, in an illumination light communication device on the transmitting side, the communication signal is superimposed on the illumination light by turning on/off an illumination light outputted from a light source unit including the light emitting diodes as a light source. Then, a receiver on the receiving side receives the communication signal by detecting a difference between a light intensity when the pulse of the communication signal is not superimposed and a light intensity when the pulse of the communication signal is superimposed.

When modulating the intensity of the illumination light as described above, in order to make it easier to detect a difference in light intensity, the light intensity is modulated, e.g., at a modulation degree of 50%, i.e., such that 50% of a maximum of the load current becomes a minimum of the load current. In case of modulating the light intensity while maintaining a constant modulation degree as described above, if dimming is controlled to result in a high (bright) light level, it is easy and no problem to detect the difference in the light intensity because the difference between the maximum and the minimum of the load current is large enough. However, if dimming is controlled to result in a low (dark) light level, it becomes difficult to detect the difference in the light intensity since the difference between the maximum and the minimum of the load current decreases, which causes a problem in that it becomes difficult to receive the communication signal and fine communication cannot be maintained.

SUMMARY OF THE INVENTION

In view of the above, the present invention provides an illumination light communication device capable of maintaining fine communication even when dimming is controlled to result in a low (dark) light level, and an illumination apparatus and illumination system including same.

In accordance with an embodiment of the present invention, there is provided an illumination light communication device including: a light source unit including light emitting elements; a power supply unit which controls a load current flowing through the light source unit to be maintained at a constant value based on a dimming signal; an impedance unit connected in series to the light source unit to vary an impedance; a switch element connected in parallel to the impedance unit to connect or disconnect the impedance unit with the light source unit; and a control unit configured to control on/off of the switch element to modulate a light intensity of illumination light outputted from the light source unit such that a binary communication signal is superimposed on the illumination light.

Further, the control unit controls the impedance of the impedance unit such that a difference between a magnitude of the load current when a pulse of the communication signal is superimposed and a magnitude of the load current when a pulse of the communication signal is not superimposed is maintained constant regardless of a dimming rate of the dimming signal in a range of a dimming rate equal to or greater than a first predetermined dimming rate.

In accordance with another embodiment of the present invention, there is provided an illumination light communication device including: a light source unit including light emitting elements; a power supply unit which controls a load current flowing through the light source unit to be maintained at a constant value based on a dimming signal; an impedance unit connected in series to the light source unit to vary an impedance; a switch element connected in parallel to the impedance unit to connect or disconnect the impedance unit with the light source unit; and a control unit configured to control on/off of the switch element to modulate a light intensity of illumination light outputted from the light source unit such that a binary communication signal is superimposed on the illumination light.

Further, the control unit controls the impedance of the impedance unit such that a modulation degree of the light intensity of the illumination light from the light source unit is maintained constant in a range of a dimming rate of the dimming signal equal to or greater than a first predetermined dimming rate and a difference between a magnitude of the load current when a pulse of the communication signal is superimposed and a magnitude of the load current when a pulse of the communication signal is not superimposed is maintained constant regardless of a dimming rate of the dimming signal in a range of a dimming rate less than the first predetermined dimming rate and equal to or greater than a second predetermined dimming rate.

Further, the control unit may perform dimming on the light source unit by varying a ratio of on-duty per unit time of the load current flowing through the light source unit in the range of a dimming rate less than the first predetermined dimming rate.

Further, the impedance unit may include a series circuit or a parallel circuit of one or more impedance elements and one or more switching elements, or a combination thereof to vary the impedance by controlling on/off of the switching elements.

In accordance with still another embodiment of the present invention, there is provided an illumination apparatus including an apparatus body including the illumination light communication device described above.

In accordance with still another embodiment of the present invention, there is provided an illumination system including: the illumination light communication device described above; and a receiver which receives the communication signal transmitted from the illumination light communication device.

In accordance with the present invention, fine communication can be maintained even when dimming is controlled to result in a low light level.

BRIEF DESCRIPTION OF THE DRAWINGS

The objects and features of the present invention will become apparent from the following description of embodiments, given in conjunction with the accompanying drawings, in which:

FIGS. 1A and 1B show an illumination light communication device in accordance with a first embodiment of the present invention, wherein FIG. 1A is a schematic circuit diagram and FIG. 2B is a waveform diagram of a load current depending on a dimming rate;

FIG. 4 shows a waveform diagram of a load current depending on a dimming rate in an illumination light communication device in accordance with a second embodiment of the present invention;

FIGS. 5A to 5C show an illumination light communication device in accordance with a third embodiment of the present invention, wherein FIG. 5A is a schematic circuit diagram, FIG. 5B is a waveform diagram of a load current depending on a dimming rate, and FIG. 5C is a waveform diagram of a load current depending on a dimming rate in PWM control;

FIGS. 7A and 7B illustrate an illumination system in accordance with a fifth embodiment of the present invention, wherein FIG. 7A is a schematic view of the illumination system and FIG. 7B is a schematic view of a receiver.

DETAILED DESCRIPTION OF THE EMBODIMENTS

First Embodiment

Figure 2:
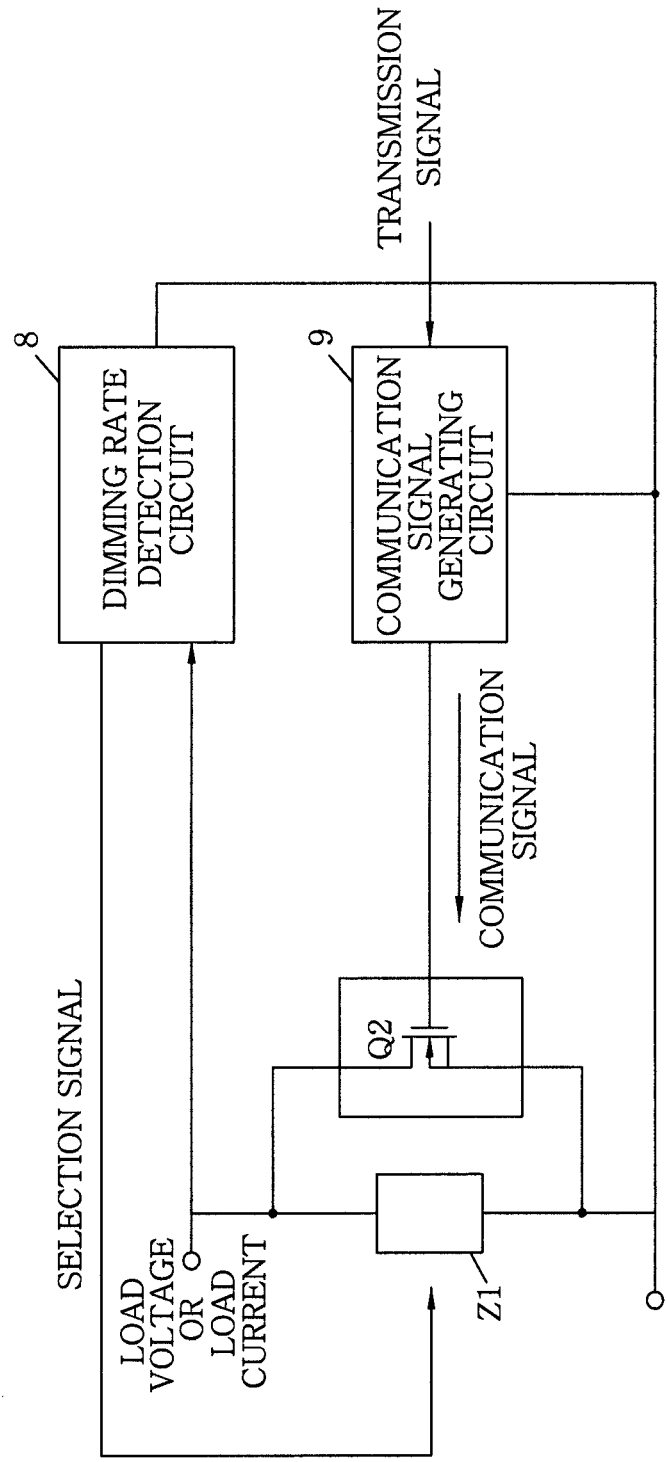
FIG. 2 is a schematic view of an essential part of the circuit of the illumination light communication device.

Hereinafter, an illumination light communication device in accordance with a first embodiment of the present invention will be described with reference to the accompanying drawings which form a part hereof.

The illumination light communication device in this embodiment includes, as shown in FIG. 1A, a DC-DC converter 2 connected to a DC power supply 1 as an input source, a rectifier circuit 3 having a diode and a smoothing capacitor C1. The DC-DC converter 2 converts a DC voltage from the DC power supply 1 to a predetermined DC voltage by switching it through a switch element Q1 such as a MOSFET and rectifying and smoothing its output through the rectifier circuit 3 and the smoothing capacitor C1.

Connected in series between output terminals of the DC-DC converter 2, i.e., across the smoothing capacitor C1, are a light source unit 4 including light emitting diodes (light emitting elements) LD1 and a current detection resistor 5. One end of the current detection resistor 5 is connected to an inverting input terminal of an error amplifier A1. Accordingly, a potential of one end of the current detection resistor 5 is inputted to the inverting input terminal of the error amplifier A1. The other end of the current detection resistor 5 is connected to a non-inverting input terminal of the error amplifier A1 via a reference voltage source E1. Thus, the error amplifier A1 outputs, to an output control unit 7, a signal obtained by amplifying a difference between a voltage drop through the current detection resistor 5 and a source voltage of the reference voltage source E1.

The output control unit 7 controls the on/off of the switch element Q1 based on an externally inputted dimming signal and a feedback signal inputted from the error amplifier A1. Accordingly, the output control unit 7 maintains a load current I1 flowing through the light source unit 4 at a constant value and controls the load current I1 based on the dimming signal.

In addition, a phase compensation circuit 6A including a resistor R1 and a capacitor C2 serving as an integral element is connected between the output terminal and the inverting input terminal of the error amplifier A1. The phase compensation circuit 6A adjusts a phase of the feedback signal by suppressing the gain in a high frequency region while increasing the gain in a low frequency region. A constant current feedback circuit 6 is configured to include the error amplifier A1 and the phase compensation circuit 6A.

That is, in this embodiment, a power supply unit for controlling the load current I1 flowing through the light source unit 4 is configured to include the DC power supply 1, the DC-DC converter 2, the rectifier circuit 3, the smoothing capacitor C1, the current detection resistor 5, the constant current feedback circuit 6 and the output control unit 7.

Connected in series to the light source unit 4 is a parallel circuit of an impedance unit Z1 and a switch element Q2. The switch element Q2 is, for example, a MOSFET and is turned on/off by an externally inputted communication signal. The impedance unit Z1 includes, e.g., a plurality of impedance elements (not shown) such as variable resistors and is configured so as to change the impedance by an externally inputted selection signal. For example, the impedance unit Z1 includes a series circuit or parallel circuit of each impedance element Zi and one or more switching elements SWi, or a combination thereof. Further, the impedance unit Z1 can vary the impedance by controlling the on/off of each switching element appropriately based on the selection signal.

Accordingly, in this embodiment, by controlling the on/off of the switch element Q2 based on the communication signal, the impedance unit Z1 can be connected to or disconnected from the light source unit 4. Thus, it is possible to change the magnitude of the load current I1 flowing through the light source unit 4, i.e., the light intensity of the illumination light from the light source unit 4. Consequently, it is possible to modulate the light intensity of the illumination light from the light source unit 4.

Further, as described above, since it is possible to change the impedance of the impedance unit Z1 based on the selection signal, it is possible to finely adjust the magnitude of the load current I1 flowing through the light source unit 4, i.e., the modulation width of the light intensity of the illumination light from the light source unit 4.

Further, in this embodiment, as shown in FIG. 2, there are provided a dimming rate detection circuit 8 for detecting a dimming rate of the light source unit 4 and a communication signal generating circuit 9 for generating a communication signal. The dimming rate detection circuit 8 detects the dimming rate of the light source unit 4 based on the load current or the load voltage of the light source unit 4, generates a selection signal based on the detected dimming rate and outputs the selection signal to the impedance unit Z1. That is, the dimming rate detection circuit 8 variably controls the impedance of the impedance unit Z1 based on the detected dimming rate.

The communication signal generating circuit 9 generates a binary communication signal and outputs the binary communication signal to the switch element Q2. For example, the communication signal generating circuit 9 generates the binary communication signal on the basis of a transmission signal inputted from an external device (not shown). That is, in this embodiment, a control unit is configured to include the dimming rate detection circuit 8 and the communication signal generating circuit 9 to control the on/off of the switch element Q2 such that the communication signal is superimposed on the illumination light outputted from the light source unit 4.

Hereinafter, an operation of visible light communication in this embodiment will be described. In this embodiment, the visible light communication is carried out by modulating the light intensity of the illumination light from the light source unit 4 by using the communication signal, and a four pulse position modulation (4PPM) scheme is employed as its modulation scheme. The four pulse position modulation is to transmit two bits of data by dividing a predetermined time defined as a symbol time into four slots, and inputting a pulse to any one of these slots, as shown in FIG. 3.

Figure 3:
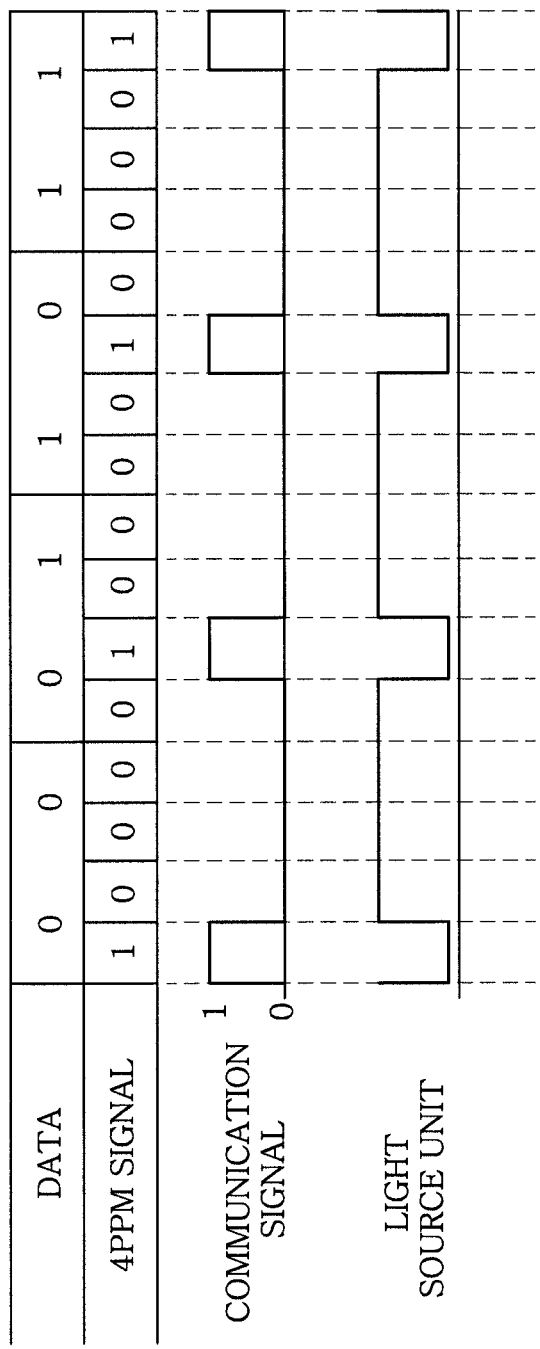
FIG. 3 is a view for explaining visible light communication in the illumination light communication device.

For example, as shown in FIG. 3, if the communication signal (4PPM signal) in one symbol time is "1000", data of "00" can be transmitted, and if the communication signal in one symbol time is "0100", data of "01" can be transmitted. Similarly, if the communication signal in one symbol time is "0010", data of "10" can be transmitted, and if the communication signal in one symbol time is "0001", data of "11" can be transmitted.

In a method of increasing the light intensity of the illumination light from the light source unit 4 when the pulse of the communication signal is superimposed on the illumination light and reducing the light intensity of the illumination light from the light source unit 4 when the pulse of the communication signal is not superimposed on the illumination light, the light emission time having a large light intensity per symbol time is 25%, and the illumination efficiency becomes poor.

However, in this embodiment, there has been employed a method in which the light intensity of the illumination light from the light source unit 4 is reduced when the pulse of the communication signal is superimposed on the illumination light and is increased when the pulse of the communication signal is not superimposed on the illumination light has been employed. Accordingly, the light emission time having a large light intensity per symbol time is ensured to be at least 75%, thereby improving the illumination efficiency.

In case of employing the four pulse position modulation scheme to carry out the visible light communication, if a difference between a maximum and a minimum of the light intensity of the illumination light from the light source unit 4 is small, it may be difficult for a receiver (not shown) to detect such difference, so that the communication signal may not be received.

Thus, in this embodiment, the impedance of the impedance unit Z1 is controlled such that a difference between the magnitude of the load current I1 when the pulse of the communication signal is superimposed and the magnitude of the load current I1 when the pulse of the communication signal is not superimposed is kept constant regardless of the dimming rate in a range of a dimming rate equal to or greater than a predetermined dimming rate. Further, the impedance of the impedance unit Z1 is controlled such that the light source unit 4 is turned off when the pulse of the communication signal is superimposed in a range of a dimming rate less than the predetermined dimming rate.

For example, as shown in FIG. 1B, if the dimming rate is equal to or greater than 50%, the impedance of the impedance unit Z1 when the switch element Q2 is turned off is controlled such that a difference between the magnitude of the load current I1 when the pulse of the communication signal is superimposed and the magnitude of the load current I1 when the pulse of the communication signal is not superimposed becomes constant, i.e., an amplitude depth D1, regardless of the dimming rate, wherein the amplitude depth D1 is a difference between a maximum and a minimum of the load current I1 when the dimming rate is 100%. Further, if the dimming rate is less than 50%, the impedance of the impedance unit Z1 is controlled such that the magnitude of the load current I1 when the pulse of the communication signal is superimposed becomes zero.

Specifically, for example, if the impedance of the impedance unit Z1 is controlled such that the amplitude depth D1 at the modulation degree of 50% in case where the dimming rate is 100% is kept constant regardless of the dimming rate, the amplitude depth D1 can be maintained at a constant until the dimming rate becomes 50%. In this case, in an assumption, for convenience of explanation, that a dimming rate ratio (e.g., dimming rate of 50%/dimming rate of 100%) is equal to a load current ratio (e.g., magnitude of the load current at the dimming rate of 50%/magnitude of the load current at the dimming rate of 100%), the amplitude depth D1 is maintained at a constant until the dimming rate becomes 50%. Therefore, the difference between the maximum and the minimum of the light intensity of the illumination light from the light source unit 4 can be sufficiently large even if the dimming is controlled to result in a low light level, and thus it is easier to detect the difference on the receiver side, and fine communication can be maintained.

If the dimming rate is less than 50%, the amplitude depth D1 cannot be maintained at a constant, however, as shown in FIG. 1B, two values of the binary communication signal correspond to the presence/absence of the load current I1, i.e., the turn-on/turn-off of the light source unit 4. For this reason, the communication signal can be easily detected on the receiver side based on the presence/absence of the light intensity, so that it is possible to maintain fine communication.

In this embodiment, the modulation degree can be defined as follow:

maximum of load current*((100-modulation degree (%))/100)=load current when pulse of communication signal is superimposed. Same can be applied to other embodiments which will be described later.

Further, although the explanation has been made while the modulation degree is set to 50% and the dimming rate of 50% is set as a boundary condition in the above embodiment, they are merely exemplary values, and the modulation degree and the dimming rate set as a boundary condition can be changed variously. However, the dimming rate set as a boundary condition is required to be greater than zero.

Second Embodiment

Hereinafter, an illumination light communication device in accordance with a second embodiment of the present invention will be described with reference to the accompanying drawings. Further, since a basic configuration of the second embodiment is the same as that of the first embodiment, like reference numerals will be given to like parts, and a redundant description thereof will be omitted.

In this embodiment, as shown in FIG. 4, if the dimming rate of the light source unit 4 reaches a predetermined dimming rate, the modulation process of the light intensity of the illumination light from the light source unit 4 is changed. That is, in this embodiment, the impedance of the impedance unit Z1 is controlled such that the modulation degree of the light intensity of the illumination light from the light source unit 4 is kept constant in a range of a dimming rate equal to or greater than a predetermined dimming rate, while an amplitude depth D2 of the light intensity of the illumination light from the light source unit 4 is kept constant in a range of a dimming rate less than the predetermined dimming rate.

For example, as shown in FIG. 4, in a range where the dimming rate is equal to or greater than 40%, the impedance of the impedance unit Z1 is controlled such that the modulation degree is maintained at 50% irrespective of changes in the dimming rate. In such range where the dimming result is controlled to be not too dark, even if it is controlled to make the modulation degree constant as in the conventional case, the difference between the maximum and the minimum of the light intensity of the illumination light from the light source unit 4 can be sufficiently large. Accordingly, it is easier to detect such difference on the receiver side, and fine communication can be maintained.

On the other hand, in a range where the dimming rate is less than 40%, the impedance of the impedance unit Z1 is controlled such that the amplitude depth D2 at the modulation degree of 50% in case where the dimming rate is 40% is maintained constant regardless of the dimming rate. In other words, as in the first embodiment, the impedance of the impedance unit Z1 is controlled such that the difference between the magnitudes of the load currents I1 flowing through the light source unit 4 respectively when the pulse of the communication signal is superimposed and when the pulse of the communication signal is not superimposed is kept constant regardless of the dimming rate. Therefore, the difference between the maximum and the minimum of the light intensity of the illumination light from the light source unit 4 can be sufficiently large even if the dimming is controlled to result in a low light level, and thus it is easier to detect such difference on the receiver side, and fine communication can be maintained.

Further, if the dimming rate is less than 20%, the amplitude depth D2 cannot be maintained at a constant. However, as shown in FIG. 1B, two values of the binary communication signal correspond to the presence/absence of the load current I1, i.e., the turn-on/turn-off of the light source unit 4. For this reason, the communication signal can be easily detected on the receiver side based on the presence/absence of the light intensity, so that it is possible to maintain fine communication.

Further, although the explanation has been made while the modulation degree is set to 50% and the dimming rates of 40% and 20% are set as a boundary condition in the above embodiment, they are merely exemplary values, and the modulation degree and the dimming rate set as a boundary condition can be changed variously. However, the dimming rate set as a boundary condition is required to be greater than zero.

Third Embodiment

Figure 5A:
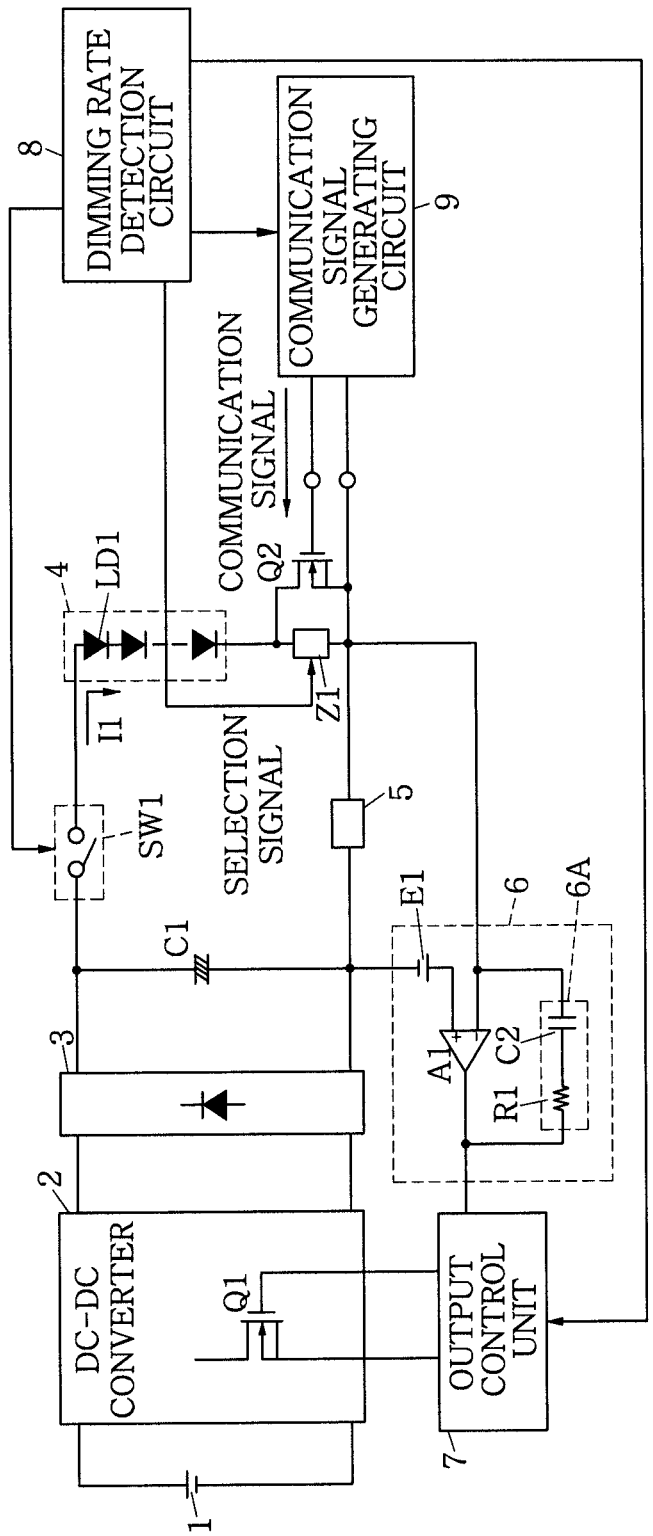

Hereinafter, an illumination light communication device in accordance with a third embodiment of the present invention will be described with reference to the accompanying drawings. Further, since a basic configuration of the third embodiment is the same as that of the first embodiment, like reference numerals will be given to like parts, and a redundant description thereof will be omitted. In this embodiment, as shown in FIG. 5A, a switching circuit SW1 is connected in series to the light source unit 4 to open and close a path connecting between the smoothing capacitor C1 and the light source unit 4. The switching circuit SW1 is switched on/off on the basis of a switching signal applied from the dimming rate detection circuit 8. Accordingly, the light source unit 4 can be dimmed by a so-called PWM control in which a period (ON time) during which the load current I1 flows through the light source unit 4 and a period (OFF time) during which no load current I1 flows through the light source unit 4 are alternately repeated.

In this embodiment, as shown in FIG. 5B, if the dimming rate of the light source unit 4 reaches a predetermined dimming rate, the modulation process of the light intensity of the illumination light from the light source unit 4 is changed. That is, in this embodiment, the impedance of the impedance unit Z1 is controlled such that the modulation degree of the light intensity of the illumination light from the light source unit 4 is maintained constant in a range of a dimming rate equal to or greater than a predetermined dimming rate in the same way as in the second embodiment. Further, in a range of a dimming rate less than the predetermined dimming rate, the on/off of the switching circuit SW1 is controlled while an amplitude depth D3 of the light intensity of the illumination light from the light source unit 4 is maintained constant. Accordingly, dimming on the light source unit 4 is performed by the PWM control to change a ratio of on-duty per unit time (e.g., 1/9600 second) of the load current I1 flowing through the light source unit 4.

Hereinafter, an operation of visible light communication in this embodiment will be described. In an example shown in FIG. 5B, in a range where the dimming rate is equal to or greater than 20%, similarly to the second embodiment, the impedance of the impedance unit Z1 is controlled such that the modulation degree is maintained at 50% irrespective of changes in the dimming rate. In such range where the dimming result is controlled to be not too dark, even if it is controlled to make the modulation degree constant as in the conventional case, the difference between the maximum and the minimum of the light intensity of the illumination light from the light source unit 4 can be sufficiently large. Accordingly, it is easier to detect the difference on the receiver side, and fine communication can be maintained.

On the other hand, in a range where the dimming rate is less than 20%, the dimming rate detection circuit 8 starts controlling to switch the on/off of the switching circuit SW1 by providing a switching signal to the switching circuit SW1, thereby starting to perform dimming on the light source unit 4 by the PWM control. In the PWM control, the impedance of the impedance unit Z1 is controlled such that the difference between the magnitude of the load current I1 when the pulse of the communication signal is superimposed and the magnitude of the load current I1 when the pulse of the communication signal is not superimposed becomes constant, i.e., the amplitude depth D3, regardless of the dimming rate, wherein the amplitude depth D3 is an amplitude depth of the light intensity of the illumination light from the light source unit 4 at the modulation degree of 50% in case where the dimming rate is 20%. Therefore, in this embodiment, the range of the dimming control can be further expanded to a lower light level while the amplitude depth D3 of the load current I1 is maintained constant.

For example, if it has been switched to the PWM control while setting the dimming rate of 20% as a boundary condition, the dimming rate can be reduced to, e.g., 15%, 10% or 5% by reducing a ratio of on-duty per unit time of the load current I1 as shown in FIG. 5C. Further, if it has been switched to the PWM control while setting the dimming rate of 10% as a boundary condition, the dimming rate can be reduced to, e.g., 7.5%, 5% or 2.5% by reducing a ratio of on-duty per unit time of the load current I1 as shown in FIG. 5C. Furthermore, if it is switched to the PWM control while setting the dimming rate of 10% as a boundary condition, dimming can be performed up to the dimming rate of 1% when a ratio of on-duty per unit time of the load current I1 is reduced to 10%.

In addition, a switching frequency of the switching circuit SW1 at the time of the PWM control is equal to the frequency (e.g., 9.6 kHz) of the communication signal to be superimposed, and the PWM control is carried out in synchronization with the communication signal. Further, the switching frequency may be set to an integer multiple of the frequency of communication signal.

Hereinafter, a specific example of the PWM control in a range where the dimming rate is less than 20% in this embodiment will be described.

In this embodiment, the dimming signal externally inputted to the output control unit 7 is also inputted to the dimming rate detection circuit 8. Accordingly, in a range where the dimming rate is equal to or greater than 20%, the dimming rate detection circuit 8 detects the load current controlled by the output control unit 7 to detect the dimming rate of the light source unit 4, and variably controls the impedance of the impedance unit Z1 based on the detected dimming rate.

On the other hand, in a range where the dimming rate is less than 20%, the dimming rate detection circuit 8 detects the dimming rate based on the dimming signal inputted to the dimming rate detection circuit 8 rather than the load current or load voltage. That is, in a range where the dimming rate is less than 20%, when the dimming rate detection circuit 8 detects that the dimming rate becomes less than 20% based on the dimming signal, it transmits a signal to the output control unit 7 to maintain the load current at the dimming rate of 20%, thereby performing the PWM control to control the on/off of the switching circuit SW1 while maintaining the load current at the dimming rate of 20%.

Further, in the PWM control, the dimming rate can be reduced by reducing a ratio of on-duty per unit time of the load current while the impedance of the impedance unit Z1 is controlled such that the difference (amplitude depth D3) between the magnitude of the load current when the pulse of the communication signal is superimposed and the magnitude of the load current when the pulse of the communication signal is not superimposed is kept constant regardless of the dimming rate.

Meanwhile, although the explanation has been made while the dimming rate of 20% is set as a boundary condition in this embodiment, as in the second embodiment, the dimming rate of 40% may be set as a boundary condition. That is, the modulation degree of 50% and the dimming rate of 20% in the above embodiment are merely exemplary values, and the modulation degree and the dimming rate set as a boundary condition can be changed variously. However, the dimming rate set as a boundary condition is required to be greater than zero.

Further, the first embodiment and the third embodiment may be combined with each other. For example, in a range where the dimming rate is equal to or greater than 50%, as in the first embodiment, the impedance of the impedance unit Z1 is controlled such that the amplitude depth D1 of the light intensity of the illumination light from the light source unit 4 is kept constant regardless of the dimming rate. In a range where the dimming rate is less than 50%, the dimming rate may be controlled by the PWM control to control the on/off of the switching circuit SW1 as in the third embodiment while the load current is maintained at the dimming rate of 50% and the amplitude depth D1 of the light intensity of the illumination light from the light source unit 4 when the pulse of the communication signal is superimposed is maintained constant.

Further, the second embodiment and the third embodiment may be combined with each other. For example, in a range where the dimming rate is equal to or greater than 40%, as in the second embodiment, it is controlled such that the modulation degree is maintained constant. Further, in a range where the dimming rate is equal to or greater than 20% and less than 40%, as in the second embodiment, it is controlled such that the difference between the magnitudes of the load currents respectively when the pulse of the communication signal is superimposed and when the pulse of the communication signal is not superimposed is maintained constant regardless of the dimming rate. In a range where the dimming rate is less than 20%, the dimming rate may be controlled by the PWM control as in the third embodiment while the load current is maintained at the dimming rate of 20% and the amplitude depth D3 of the light intensity of the illumination light from the light source unit 4 when the pulse of the communication signal is superimposed is maintained constant.

Fourth and Fifth Embodiment

Figure 6A:
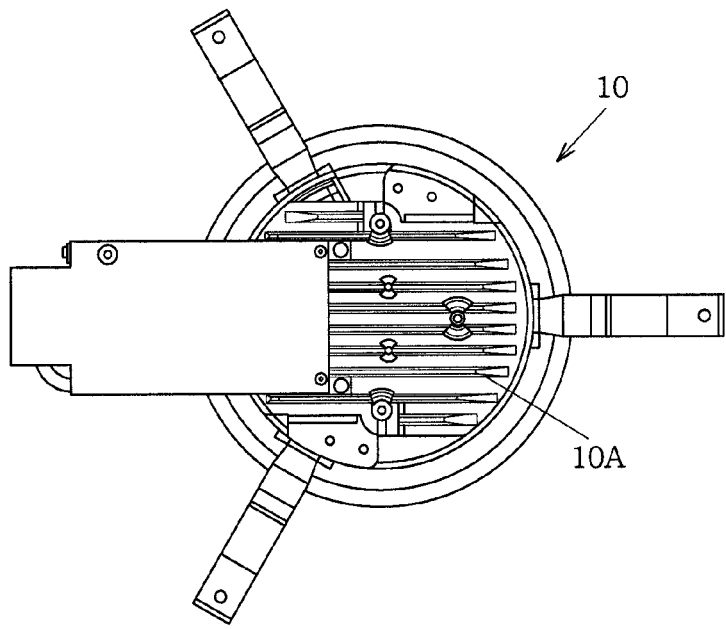
FIGS. 6A to 6C illustrate an illumination apparatus in accordance with a fourth embodiment of the present invention.
Figure 6B:
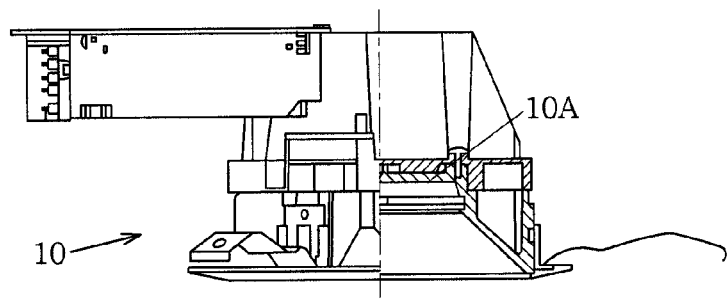
Figure 6C:
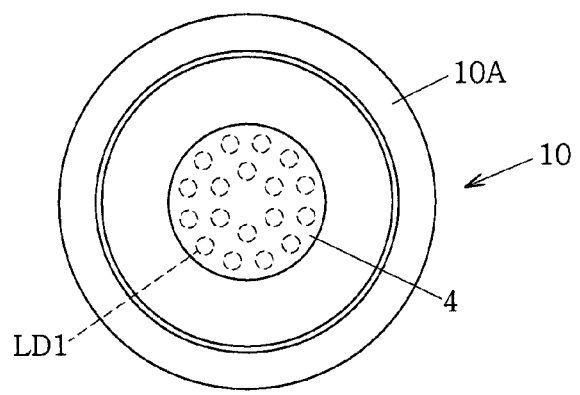

Hereinafter, an illumination apparatus and an illumination system in accordance with a fourth and a fifth embodiment of the present invention will be described with reference to the drawings. Further, in the following description, a direction extending up and down in FIG. 6B is referred to as a vertical direction. First, the illumination apparatus will be described. An illumination apparatus 10 of this embodiment is, e.g., of a down light with a mortar-shaped apparatus body 10A whose bottom is open as shown in FIG. 6A to 6C. Further, the illumination light communication device (not shown) of any of the first to third embodiments is retained in the apparatus body 10A. The light source unit 4 included in the illumination light communication device is disposed to face an external space through a bottom opening of the apparatus body 10A, and irradiates illumination light toward the external space. In addition, the illumination apparatus 10 may be an illumination apparatus having other configurations without being limited to the down light.

In this embodiment, since the visible light communication is performed by using the illumination light communication device of one of the first to third embodiments, fine communication can be maintained even if the dimming is controlled to result in low light level.

Figure 7A:
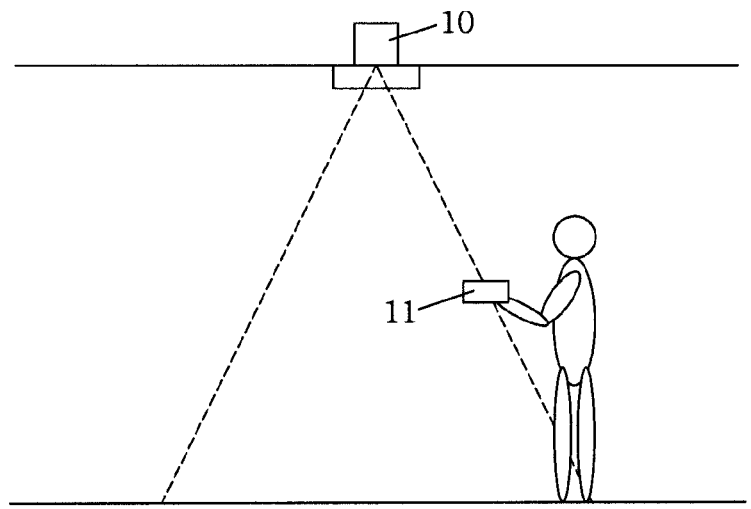

Next, the illumination system in accordance with the fifth embodiment of the present invention will be described. The illumination system in this embodiment includes, as shown in FIG. 7A, the illumination light communication device (not shown) of one of the first to third embodiments and a receiver 11 which receives the communication signal transmitted from the illumination light communication device. Further, in this embodiment, the illumination light communication device is retained in the illumination apparatus 10 embedded in the ceiling.

Figure 7B:
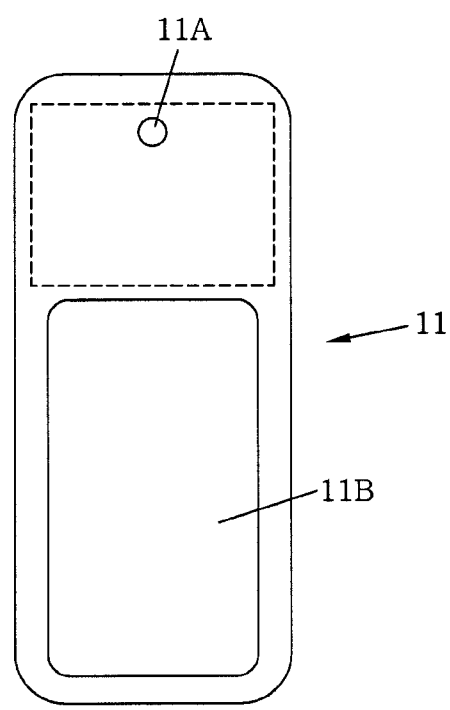

The receiver 11 is formed of, e.g., a mobile terminal and includes a photodiode 11A receiving the illumination light irradiated from the illumination apparatus 10, as shown in FIG. 7B. Further, the receiver 11 includes a display unit 11B formed of, e.g., a liquid crystal monitor or the like, an operation unit (not shown), and a processing circuit (not shown) which reads the communication signal based on the light intensity of the illumination light received by the photodiode 11A. Further, the operation unit may be implemented by configuring the display unit 11B as a touch panel. In addition, the receiver 11 may be a receiver having other configurations without being limited to the mobile terminal.

Therefore, as shown in FIG. 7A, the user is in possession of the receiver 11 and can receive the communication signal superimposed on the illumination light from the illumination apparatus 10 within an illumination range of the illumination apparatus 10. Thus, the receiver 11 detects, e.g., position information contained in the communication signal and displays an image on the display unit 11B or outputs voice through a built-in speaker, thereby informing the user of a current position. Further, the purpose of this embodiment may be any other purpose without being limited to the purpose of informing the user of the current position.

Further, in this embodiment, since the visible light communication is performed by using the illumination light communication device of one of the first to third embodiments, fine communication can be maintained even if the dimming is controlled to result in a low light level.

Further, in each of the embodiments described above, the light emitting diodes LD1 are used as light emitting elements included in the light source unit 4. However, without being limited thereto, other light emitting elements such as organic electroluminescence (EL) elements and semiconductor lasers may be used.

While the invention has been shown and described with respect to the embodiments, it will be understood by those skilled in the art that various changes and modification may be made without departing from the scope of the invention as defined in the following claims.

What is claimed is:

1. An illumination light communication device comprising:
   a light source unit including light emitting elements;
   a power supply unit which controls a load current flowing through the light source unit to be maintained at a constant value based on a dimming signal;
   an impedance unit connected in series to the light source unit to vary an impedance;
   a switch element connected in parallel to the impedance unit to connect or disconnect the impedance unit with the light source unit; and
   a control unit configured to control on/off of the switch element to modulate a light intensity of illumination light outputted from the light source unit such that a binary communication signal is superimposed on the illumination light,
   wherein the control unit controls the impedance of the impedance unit such that a difference between a magnitude of the load current when a pulse of the communication signal is superimposed and a magnitude of the load current when a pulse of the communication signal is not superimposed is maintained constant regardless of a dimming rate of the dimming signal in a range of the dimming rate being equal or greater than a predetermined dimming rate.

2. The illumination light communication device of claim 1, wherein the control unit performs dimming on the light source unit by varying a ratio of on-duty per unit time of the load current flowing through the light source unit in the range of a dimming rate less than the predetermined dimming rate.

3. The illumination light communication device of claim 1, wherein the impedance unit includes a series circuit or a parallel circuit of one or more impedance elements and one or more switching elements, or a combination thereof to vary the impedance by controlling on/off of the switching elements.

4. An illumination apparatus comprising an apparatus body including the illumination light communication device described in claim 1.

5. An illumination system comprising:
   the illumination light communication device described in claim 1; and
   a receiver which receives the communication signal transmitted from the illumination light communication device.

6. An illumination light communication device comprising:
   a light source unit including light emitting elements;
   a power supply unit which controls a load current flowing through the light source unit to be maintained at a constant value based on a dimming signal;
   an impedance unit connected in series to the light source unit to vary an impedance;
   a switch element connected in parallel to the impedance unit to connect or disconnect the impedance unit with the light source unit; and
   a control unit configured to control on/off of the switch element to modulate a light intensity of illumination light outputted from the light source unit such that a binary communication signal is superimposed on the illumination light,
   wherein the control unit controls the impedance of the impedance unit such that a modulation degree of the light intensity of the illumination light from the light source unit is maintained constant in a range of a dimming rate of the dimming signal equal to or greater than a first predetermined dimming rate and a difference between a magnitude of the load current when a pulse of the communication signal is superimposed and a magnitude of the load current when a pulse of the communication signal is not superimposed is maintained constant regardless of a dimming rate of the dimming signal in a range of the dimming rate less than the first predetermined dimming rate and being equal or greater than a second predetermined dimming rate.

7. The illumination light communication device of claim 6, wherein the control unit performs dimming on the light source unit by varying a ratio of on-duty per unit time of the load current flowing through the light source unit in the range of a dimming rate less than the first predetermined dimming rate.

8. The illumination light communication device of claim 6, wherein the impedance unit includes a series circuit or a parallel circuit of one or more impedance elements and one or more switching elements, or a combination thereof to vary the impedance by controlling on/off of the switching elements.

9. An illumination apparatus comprising an apparatus body including the illumination light communication device described in claim 6.

10. An illumination system comprising:
    the illumination light communication device described in claim 6; and
    a receiver which receives the communication signal transmitted from the illumination light communication device.

* * * * *